No. 807,946. PATENTED DEC. 19, 1905.
C. H. LANG.
SCREW DRIVER.
APPLICATION FILED APR. 4, 1905.

UNITED STATES PATENT OFFICE.

CARL H. LANG, OF CHICAGO, ILLINOIS.

SCREW-DRIVER.

No. 807,946.

Specification of Letters Patent.

Patented Dec. 19, 1905.

Application filed April 4, 1905. Serial No. 253,829.

*To all whom it may concern:*

Be it known that I, CARL H. LANG, a citizen of the United States, residing at Chicago, in the county of Cook and State of Illinois, have invented certain new and useful Improvements in Screw-Drivers, of which the following is a specification.

This invention consists of a simple construction of screw-driver of the type having means for holding the screw as the same is being driven into the material to which it is applied.

The object of the invention is to secure a simplified structure of driver of this class admitting of quick manipulation of the means for holding the screw in proper position and one which is especially designed for use in applying screws to inaccessible parts of piano-actions or parts located at places where there is not sufficient room for insertion of the hand.

For a full description of the invention and the merits thereof and also to acquire a knowledge of the details of construction of the means for effecting the result reference is to be had to the following description and accompanying drawings, in which—

Figure 1:
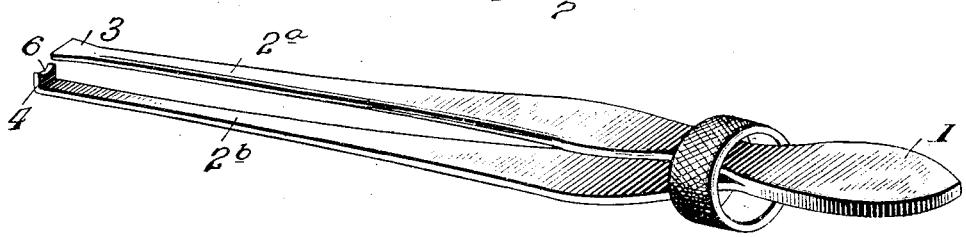
Figure 2:
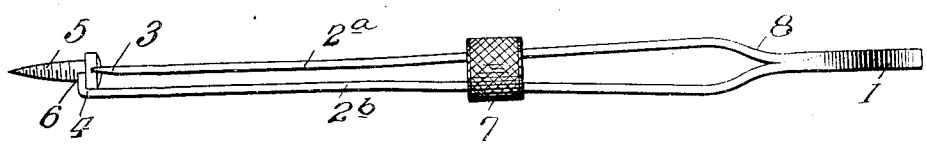
Figure 3:
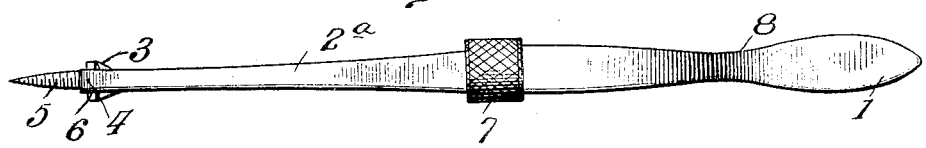

Figure 1 is a perspective view of a driver embodying the invention. Fig. 2 is a side elevation of the driver, the screw-holding member being shown in engagement with the screw. Fig. 3 is a front elevation of the driver alone.

Corresponding and like parts are referred to in the following description and indicated in all the views of the drawings by the same reference characters.

A driver constructed in accordance with this invention consists, essentially, of a handle 1 and a shank 2, composed of spring members $2^a$ and $2^b$. The spring members $2^a$ and $2^b$ are preferably made of long narrow plates of sheet steel or metal, said plates being brought together at one end and welded or otherwise secured to form the handle 1, above described. The members $2^a$ and $2^b$ consist of spring-plates, and the spring action of these members is to normally hold the same in separated positions. The extremity of the member $2^a$ opposite that adjacent the handle 1 is flattened and formed with a chisel-like extremity 3 to enter the nick of a screw. The end of the member $2^b$ adjacent the member 3 is formed with a lateral engaging projection 4, arranged to engage beneath the head of the screw, (indicated at 5.) The portion of the projection 4 which engages the screw is curved to form a seat 6, which conforms with the shape of the rounded body portion of the screw, snugly fitting the latter when the part 4 is properly engaged therewith. The member 4 engages the screw upon one side only, leaving the latter free upon the other sides in a manner which will be apparent. A ring 7 is mounted upon the shank for forcing the members $2^a$ and $2^b$ thereof together in order that the member 4 may be held in positive engagement with the screw in operating the latter to force the same into the wood or other material. The members $2^a$ and $2^b$ of the shank 2 are transversely widened near the central portions, as shown at 8, the widened portions preventing displacement of the ring 7 in one direction, and the handle 1 limits the movement of the ring in the other direction and is arranged conveniently with reference to the ring, so that when said ring is slidably moved toward the widened portions 8 of the shank the same will force the shank members $2^a$ and $2^b$ toward each other by a cam action with reference thereto, said members $2^a$ and $2^b$ being thus adapted to positively engage and hold the screw.

The widened portions 8 of the members $2^a$ and $2^b$ not only coact to limit the movement of the ring 7, but by so doing frictionally bind against the interior of the ring, and thereby resist the normal tendency of the same to slide back toward the handle under the influence of the spring separating action of said members $2^a$ and $2^b$. The ring 7 is thus positioned virtually by the engaging action of the portions 8 of the spring members $2^a$ and $2^b$ when it is moved into holding position, and a comparatively small amount of movement thereof will effect the necessary coöperation of the driver with the screw.

It will of course be understood that the screw cannot be driven home by means of the driver constituting this invention, because of the interposition of the member 4 between the head of the screw and the work. After the screw has been well started with the tool, as hereinbefore described, however, an ordinary screw-driver is employed to drive it home.

Having thus described the invention, what is claimed as new is—

As a new article of manufacture, a screw-driver consisting of a shank composed of spring members normally tending to separate and brought together at one end to form an integral handle, the central portions of the spring members being transversely widened and those portions between a central point and the handle being narrowed, a ring mounted upon the narrowed portions of the spring members and limited in movement in one direction by the handle and in the other direction by the widened central portions of said members, the said ring being adapted for slidable movement toward the widened central portions of the spring members to force the spring members together, such widened portions frictionally binding against the interior of the ring when the latter is forced toward the same, an extremity of one of the spring members having a screw-driving point, and a lateral projection extended from the other spring member and adapted to coöperate therewith in holding a screw.

In testimony whereof I affix my signature in presence of two witnesses.

CARL H. LANG. [L. S.]

Witnesses:
GEORGINA BAXTER,
MARK A. FOOTE.